(12) United States Patent
Fowler

(10) Patent No.: US 7,638,749 B2
(45) Date of Patent: Dec. 29, 2009

(54) CAPACITIVE TRANSIMPEDANCE AMPLIFIER FOR CCD ARRAYS

(75) Inventor: Boyd Fowler, Sunnyvale, CA (US)

(73) Assignee: Fairchild Imaging, Milpitas, CA (US)

( * ) Notice: Subject to any disclaimer, the term of this patent is extended or adjusted under 35 U.S.C. 154(b) by 564 days.

(21) Appl. No.: 11/447,541

(22) Filed: Jun. 5, 2006

(65) Prior Publication Data

US 2007/0279508 A1    Dec. 6, 2007

(51) Int. Cl.
*H03F 3/08*       (2006.01)
*H03K 17/78*   (2006.01)
*H04N 3/14*     (2006.01)

(52) U.S. Cl. .......................... 250/214 R; 250/214 SW; 348/311

(58) Field of Classification Search ............. 250/214 A, 250/214 R, 214 LS, 214 AL, 208.1, 214.1, 250/214 SW; 348/300, 302, 308–313; 257/290–292, 257/355–357, 529
See application file for complete search history.

(56) References Cited

U.S. PATENT DOCUMENTS 3,626,825 A * 12/1971 Years ......................... 396/213
6,246,436 B1 * 6/2001 Lin et al. .................... 348/308
6,339,363 B1    1/2002 Fowler
7,132,638 B2    11/2006 Liu et al.

\* cited by examiner

*Primary Examiner*—Kevin Pyo
*Assistant Examiner*—Don Williams
(74) *Attorney, Agent, or Firm*—Calvin B. Ward

(57) ABSTRACT

An image sensor having a first substrate on which a CCD array is fabricated in a first fabrication system is disclosed. The CCD array includes a node through which charge from the pixels passes during a readout operation. The first substrate also includes a first FET fabricated on the first substrate in the first fabrication system, the first FET having a gate connected to the node and a source or drain connected to a first conducting pad on the first substrate. A capacitor connects the node to a second conducting pad on the first substrate. A switch is connected across the first capacitor such that the first capacitor is shorted when the first switch is closed. The first switch is controlled by a reset signal on a third conducting pad on the first substrate. The first substrate can be connected to a second substrate having amplification and control circuitry.

8 Claims, 5 Drawing Sheets

CAPACITIVE TRANSIMPEDANCE AMPLIFIER FOR CCD ARRAYS

BACKGROUND OF THE INVENTION

Imaging chips that are utilized in a wide range of camera devices are based on CCD arrays. The CCD structure can be viewed as a number of columns that are divided into pixels whose boundaries can be moved to read out the charge by shifting the charge down the columns. The boundaries of the pixels and the charge shifting mechanism are implemented with a plurality of gates that overlie the portion of the substrate in which the columns are located. Each pixel on the chip has a plurality of gates. These gates are used to shift the charge along the columns and eventually to an amplifier that converts the charge to a voltage and then buffers the voltage off of the chip.

In low light applications, the amount of charge generated by each pixel is quite small; hence, a high degree of amplification is needed. If the charge to voltage conversion is performed on the CCD substrate, the amplifier is limited to the devices that can be constructed using the CCD fabrication process. CCDs require high charge-transfer efficiency. To achieve this efficiency, CCDs are fabricated using specialized processes that minimize imperfections in the semiconductor material. Most logic circuitry relies on CMOS fabrication techniques. In general, the fabrication processes used to produce CCD and CMOS imagers are incompatible. For example, the conventional CMOS fabrication processes require complex processes that lead to unacceptable imperfections in the underlying semiconductor materials. While generally acceptable in CMOS devices, these imperfections typically reduce the efficiency of CCD devices to unacceptable levels.

CCD devices are typically manufactured in an NMOS or PMOS process. If the CCD is an NMOS device, NMOS FET transistors, N type JFETs, NPN bipolar transistors with their bases shorted to ground, and PNP bipolar transistors can be fabricated; however, NPN transistors with floating bases, P type JFETs, and PMOS FETs cannot be fabricated. As a result, the circuits that can be fabricated on the CCD chip itself are limited to source follower type circuits that provide very little voltage gain. The resultant signals are in the microvolt range, and hence, are easily contaminated with noise when the signals are transferred off of the chip to another amplification stage. As a result, designs that utilize an off-chip amplifier have been developed.

The off-chip amplifier is typically a CTIA. The gain of the amplifier is inversely proportional to the parasitic capacitance of the pad and the silicon area connected to the pad. The noise of the amplifier is proportional to the parasitic capacitance of the pad and the silicon area connected to the pad. This capacitance can be relatively large, since the pad must be large enough to be connected to the substrate on which the amplifier is located by solder bump. Hence, the maximum gain available with an off-chip CTIA is also limited.

SUMMARY OF THE INVENTION

The present invention includes an image sensor having a first substrate on which a CCD array is fabricated in a first fabrication system. The CCD array includes a plurality of pixels that accumulate charge when exposed to light and a node through which charge from each of the pixels passes during a readout operation. The first substrate also includes a first FET fabricated on the first substrate in the first fabrication system, the first FET having a gate connected to the node and a source or drain connected to a first conducting pad on the first substrate. A first capacitor on the first substrate connects the node to a second conducting pad on the first substrate. A first switch fabricated on the first substrate in the first fabrication system is connected across the first capacitor such that the first capacitor is shorted when the first switch is closed. The first switch is controlled by a reset signal on a third conducting pad on the first substrate. The pads on the first substrate can be connected to corresponding pads on a second substrate that includes an amplifier and control circuitry. The components on the second substrate can be fabricated using a second fabrication system that is different from the first fabrication system.

DETAILED DESCRIPTION OF THE PREFERRED EMBODIMENTS OF THE INVENTION

The present invention utilizes an amplifier structure in which part of the amplifier is on the CCD chip and is constructed from FETs that can be fabricated in that fabrication system, and the other part of the amplifier is located off-chip and can utilize components that are constructed from conventional CMOS or bipolar components.

Figure 1:
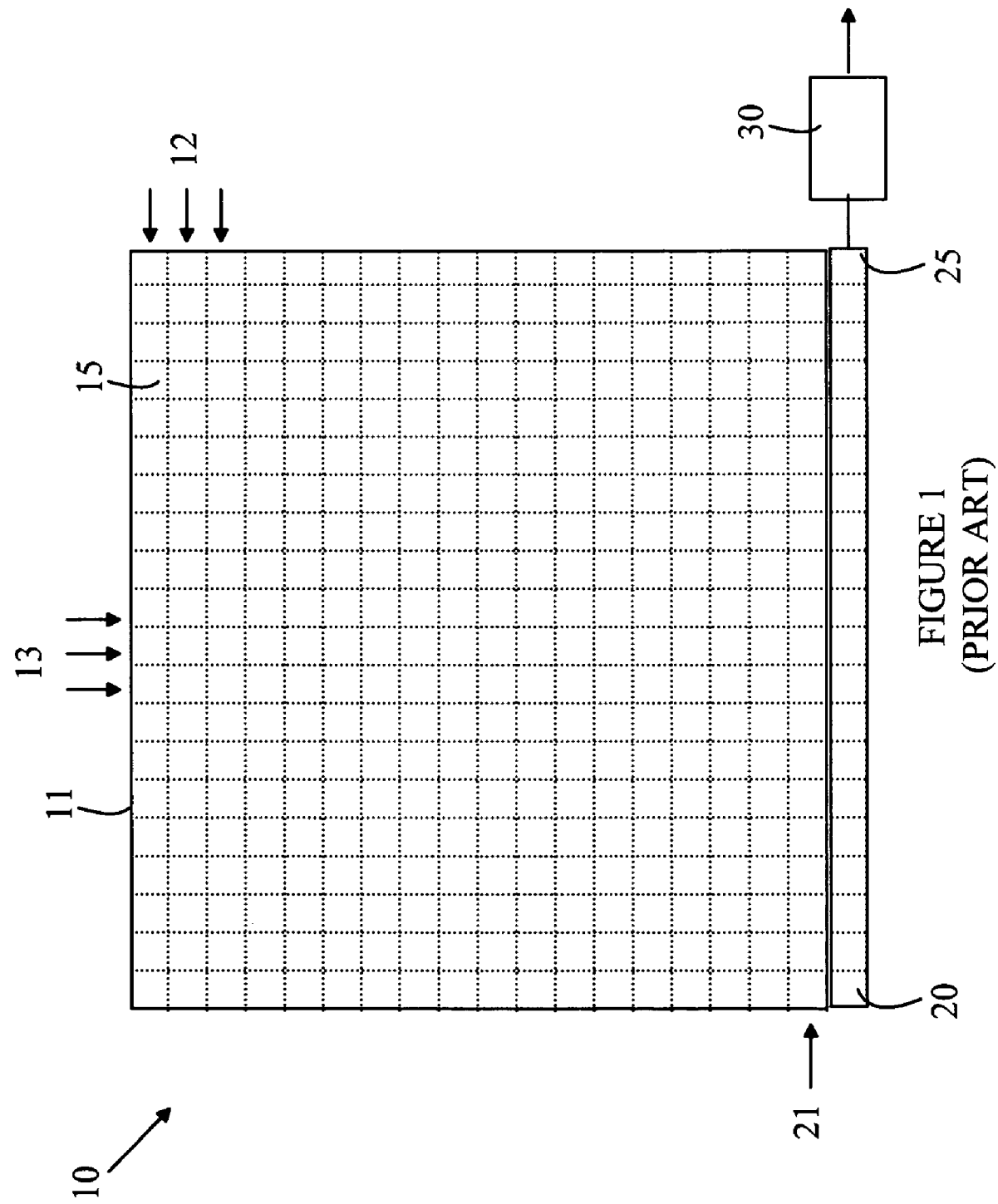
FIG. 1 illustrates a CCD imaging sensor chip according to one embodiment of the present invention.

The manner in which the present invention provides its advantages can be more easily understood with reference to FIG. 1, which illustrates a CCD imaging sensor chip according to one embodiment of the present invention. Image sensor 10 includes a photodetector array 11 in which the individual photodetectors 15 are organized as a plurality of rows 12 and columns 13. The boundaries of each photodetector are defined by a number of gates that are fabricated over the column in which the photodetector is located. In addition, the columns can be operated as shift registers to move the charge stored in the various photodetectors after the array is exposed to an image to shift register 20 by manipulating the potentials on the gates in that column. On each column shift operation, the contents of the photodetectors in row 21 are shifted into register 20, and the contents of each column are moved downward toward shift register 20. The contents of shift register 20 are then shifted horizontally into an output amplifier 30 that converts the charge in cell 25 to an output voltage in an analogous manner.

Each pixel has a plurality of gates that are used to define the pixel area within the column in which the pixel resides. The boundaries of the columns along the long sides of the columns are defined by implants. These gates consist of electrodes that are also used to shift the charge in a pixel along the columns during a readout operation. The number of electrodes varies according to the specific chip design. However, the corresponding electrodes in each pixel are connected together and are driven by off-chip circuits that are connected to drive lines via interface pads on the chip. To simplify the drawing, the various electrodes used in the shifting operations have been omitted from FIG. 1.

Figure 2:
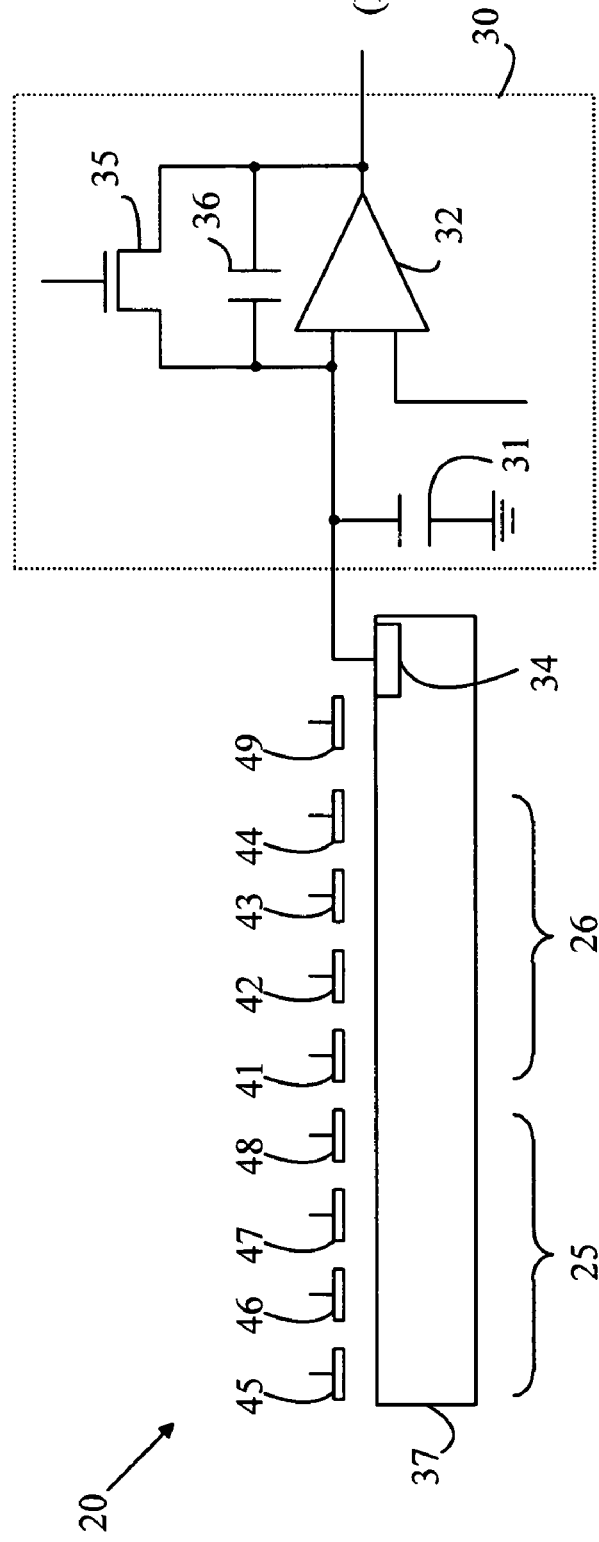
FIG. 2 illustrates the output end of a shift register and an output amplifier in a four-phase CCD.

Refer now to FIG. 2, which illustrates the output end of shift register 20 and output amplifier 30 in a four-phase CCD. The shifting operation along the columns that deposits charge into shift register 20 operates in a manner analogous to that described below for shift register 20. The manner in which charge is shifted along shift register 20 is known to the art, and hence, will not be discussed in detail here. For the purposes of this discussion, it is sufficient to note that each cell in shift register 20 includes an area of silicon in which the charge moves, and 4 electrodes that set the profile of potentials in that silicon area. Two such cells are shown at 25 and 26. The electrodes over the silicon area 37 of cell 26 are shown at 41-44. At the start of a shift cycle, the electrodes 41 and 44 are at potentials that contain the charge in the region under electrodes 42 and 43. To move the charge into amplifier 30, the potential at electrode 42 is altered to force the charge into the region under electrode 44. The potential on electrodes 44 and 49 is then altered to allow the charge to escape onto capacitor 31 at the input to operational amplifier 32. The potentials on electrodes 43 and 44 are then sequentially altered to force the charge under these electrodes to move onto capacitor 31. It should be noted that the potential on electrode 49, which acts as an output gate, is maintained at a constant potential. This output gate reduces clock coupling between the other electrodes and capacitor 31.

During the shift operation, the potentials on electrodes 45-48 associated with cell 25 are likewise manipulated to force the charge in cell 25 into cell 26. For example, when the potential on electrode 42 is altered to force charge under that electrode to the area under electrode 43, electrode 41 is no longer needed to contain the charge within cell 26. Hence, the potential on this electrode can be altered to allow charge from cell 25 to move under electrode 41. Similarly, when the potential on electrode 43 is altered to move the charge under electrode 44, the potential on electrode 42 is no longer needed to separate the charge in cells 25 and 26, and hence this electrode's potential can be altered to allow the charge from cell 25 to move under that electrode. The potential on the electrodes in cell 25 can then be altered to force the remaining charge from cell 25 to move under electrode 43 thereby completing the shifting of the charge from cell 25 to cell 26 while the charge from cell 26 was shifted onto capacitor 31.

Prior to shifting the charge onto capacitor 31, the input to operational amplifier 32 is shorted to the output by applying a reset signal to the gate of FET 35. After the input voltage has been reset, FET 35 is placed in a non-conducting state. More complex reset systems that reduce variations in the final reset voltage are known to the art and will be discussed in more detail below. For the purposes of the present discussion, it is sufficient to note that after the input voltage is reset, the charge is shifted onto capacitor 31 and operational amplifier 32 effectively transfers that charge to capacitor 36.

As noted above, operational amplifier 32 is normally fabricated on a substrate that is separate from the substrate on which the CCD array is fabricated to take advantage of amplifier designs that cannot be fabricated on the CCD substrate due to the restricted fabrication rules that apply to CCD fabrication. The connection between node 34 and the substrate in which operational amplifier 32 is fabricated is typically implemented via a metallic pad on the CCD substrate. In a hybrid sensor, this pad is bump bonded to the substrate containing operational amplifier 32. Capacitor 31 represents the parasitic capacitance of this connection. Since the pad must have a relatively large size to enable the solder bumping operation, this capacitance can be relatively large. As noted above, the noise of operational amplifier 32 is proportional to this capacitance, and hence, this arrangement has relatively poor low light performance.

Figure 3:
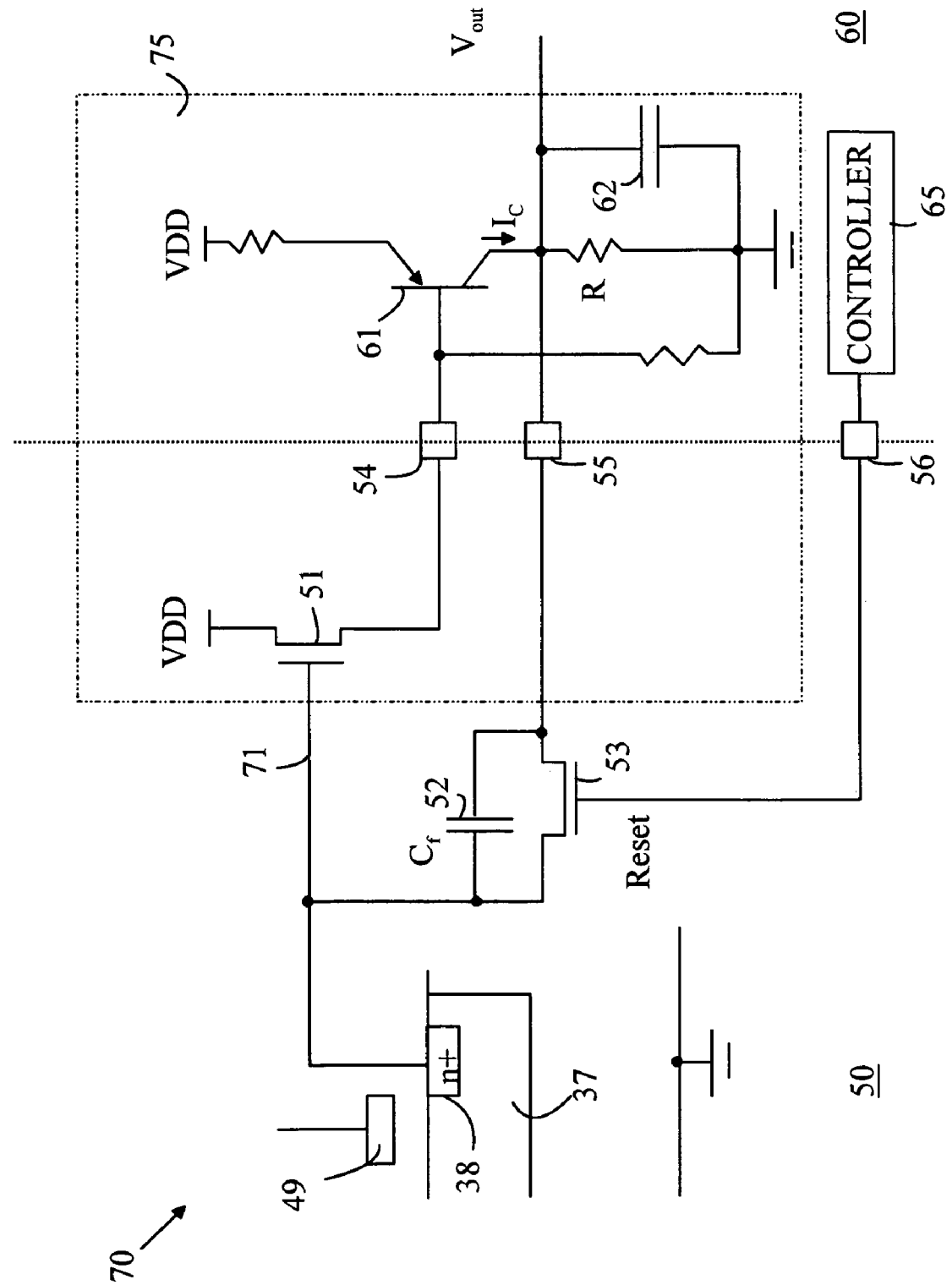
FIG. 3 illustrates a hybrid image sensor 70 according to one embodiment of the present invention.

The present invention avoids this problem by shielding node 34 from the pads that are used to make the connections between the two substrates. Refer now to FIG. 3, which illustrates a hybrid image sensor 70 according to one embodiment of the present invention. Image sensor 70 includes a CCD chip 50 on which the CCD array is fabricated and a processor chip 60, which can be constructed in CMOS or any other relevant processing system. The chips communicate via a number of pads such as pads 54 and 55. It should be noted that there are a number of other pads that provide connections between various circuits of processor chip 60 and corresponding lines on CCD chip 50 such as those used to drive the gate electrodes discussed above. To simplify the drawing, these additional pads and the related circuits on both chips have been omitted.

The end of an output shift register 37 is shown in the drawing. The charge shifted down shift register 37 is removed by a floating diffusion node 38 which serves the same function as node 34 shown in FIG. 2. The operational amplifier 75 used to readout the charge and convert the charge to a voltage is split between chips 50 and 60. Any parasitic capacitance associated with pads 54 and 55 is internal to the operational amplifier and does not significantly alter the gain of operational amplifier 75. In particular, pad 54 is isolated from the input 71 of operational amplifier 75 by a source follower that is constructed from a FET 51. As noted above, FETs can be fabricated in the same fabrication system as the CCD array. While FET 51 does not provide a significant voltage gain, FET 51 does isolate node 38 from the capacitance of pad 54. The remainder of operational amplifier 75 is constructed from a bipolar transistor 61.

In addition, the reset transistor 53, and capacitor 52 that serves the function of capacitor 36 shown in FIG. 2, are also constructed on CCD chip 60. FET 53 and capacitor 52 are connected to the output of operational amplifier 75 via pad 55. Any parasitic capacitance introduced by this pad can be effectively eliminated by adjusting the capacitance of capacitor 62.

As noted above, the charge from each pixel in the CCD array is eventually shifted down shift register 37 and read out through operational amplifier 75. Each charge readout cycle generates a signal indicative of the charge that has been shifted from a pixel onto node 38. Each cycle includes resetting the voltage at input 71, optionally storing the voltage at the output of operational amplifier 75 at the end of the reset cycle, transferring the charge to be read to node 38, and reading out the voltage at the output of operational amplifier 75. If the value of $V_{out}$ at the end of the reset cycle was stored, the stored value is subtracted from the value of $V_{out}$ that is generated after the charge has been transferred to node 38.

Input 71 is reset by applying a reset signal to FET 53. This causes node 38 to be reset to a voltage controlled by $RI_c$, where $I_c$ is the collector current through transistor 61. This operation also sets the voltage difference across capacitor 52 to zero. After the potential on node 38 has settled, the reset signal is removed. At this point, $V_{out}$ can be sampled to provide a background reading that can be subtracted later from the value of $V_{out}$ generated when the charge is transferred to node 38. This procedure reduces the effect of reset noise on capacitor 52. Once node 38 has been reset, the charge on the next pixel to be readout is gated onto node 38, and the value of $V_{out}$ recorded.

The conversion gain of operational amplifier 75 can be shown to be inversely proportional to $C_f$, the capacitance of capacitor 52; hence, if high gain is required, $C_f$ must be set as low as possible. However, there is a limit to the minimum size of capacitor 52 that is set by the fabrication process. In this regard, it should be noted that capacitor 52 must be reproducible from device to device, not just small.

Figure 4:
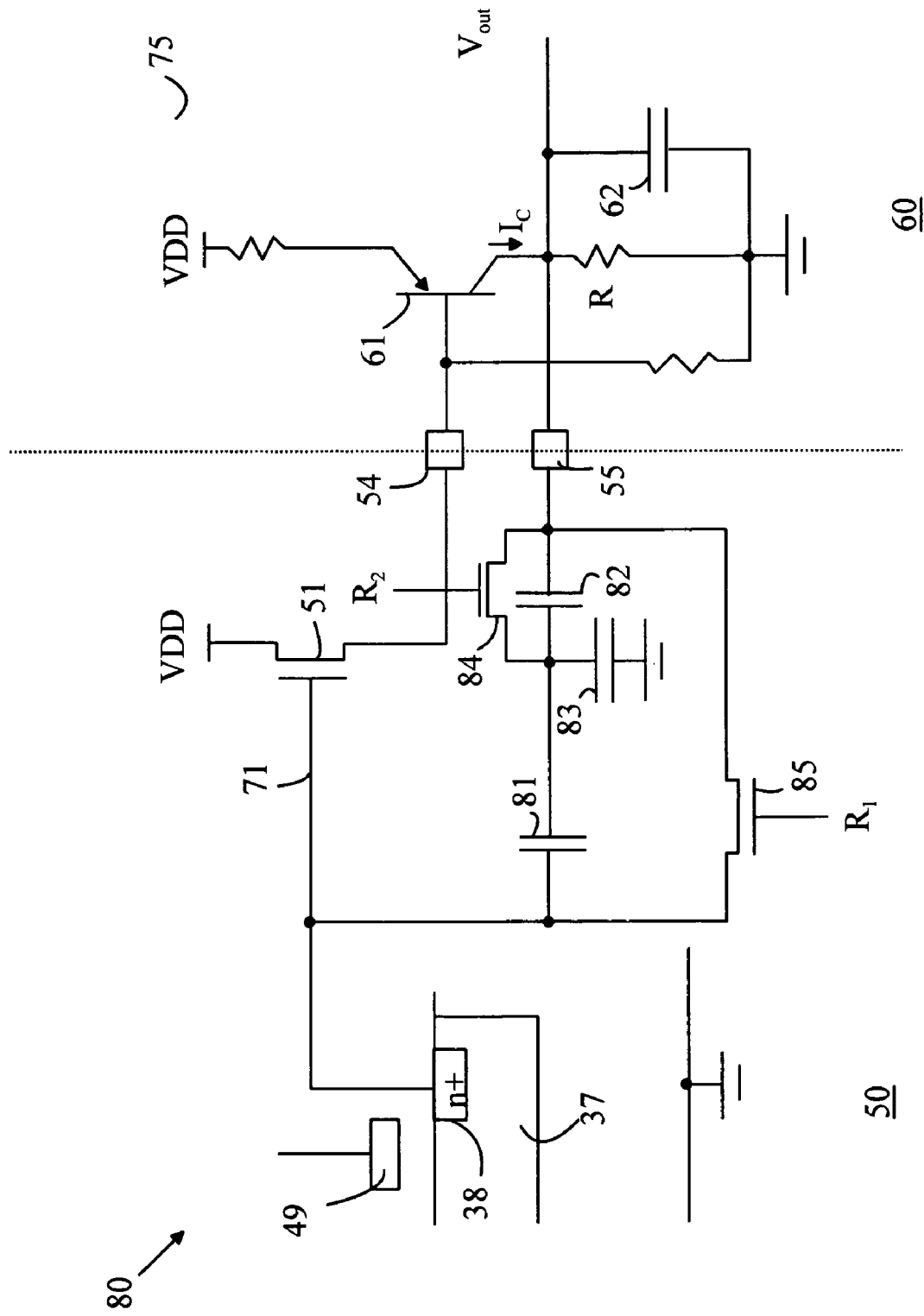
FIG. 4 is a schematic drawing of an embodiment of a hybrid image sensor 80 according to another embodiment of the present invention.

In one embodiment of the present invention, this problem is overcome by replacing the feedback capacitor with a network of capacitors constructed from capacitors that are large enough to be reproducibly fabricated. Refer now to FIG. 4, which is a schematic drawing of an embodiment of a hybrid image sensor 80 according to another embodiment of the present invention. To simplify the following discussion, those elements of image sensor 80 that serve functions analogous to those discussed above with reference to image sensor 70 have been given the same numeric designations and will not be discussed further here. Image sensor 80 differs from image sensor 70 in that feedback capacitor 52 shown in FIG. 3 is replaced by an array of capacitors 81-83, whose capacitances will be denoted by $C_1$-$C_3$, respectively, in the following discussion. Reset FETs 84 and 85 short the capacitors prior to transferring charge to capacitor node 38. The capacitance of the network is $C_2C_1/(C_1+C_2+C_3)$. Hence, if $C_3$ and $C_1$ are about the same size, i.e., $C_1=C_2=C$ and $C_3=G*C$, where $G\gg1$, the resulting network will have a capacitance that is approximately C/G, and all of the capacitors will be of a size that can be reproducibly fabricated. The reset switches are preferably operated such that the switch implemented by FET 84 closes prior to the switch implemented with FET 85. This order of operation minimizes the effects of the noise generated by the electrons leaving the transistors when the state of the switches changes.

Refer again to FIG. 3. Ideally, the voltage at node 38 at the end of each reset cycle would be the same. However, in practice, there are variations in the reset voltage from charge measurement cycle to charge measurement cycle. These variations are referred to as "reset noise". The procedure in which the output of operational amplifier 75 at the end of the reset portion of the charge measurement cycle is stored and later subtracted from the output value after the charge has been transferred substantially reduces this noise. However, this procedure does not always eliminate the reset noise, and hence, in low light applications or applications that place a premium on the charge measurement cycle time, embodiments that reduce the reset noise are desirable.

The noise levels of node 38 depend on the bandwidth of the reset path. If the bandwidth of the reset path is small, noise spikes on the output of operational amplifier 75 will be suppressed by the feedback loop, and hence, the reset noise will be reduced. In principle, the reset noise can be substantially reduced by maintaining FET 52 in a high resistance state during the reset operation or otherwise lowering the bandwidth of the reset path to be less than the bandwidth of the amplifier. This allows the feedback loop to effectively suppress the reset noise.

Unfortunately, such a low bandwidth path increases the reset time. Hence, in applications in which the reset time is critical, this solution is not possible. In this regard, it should be noted that operational amplifier 75 must process the charge collected by a very large number of pixels, one pixel at a time. Hence, the time available for processing each charge is relatively small. Since the reset time is a significant part of the total processing time for each pixel, there is a very limited period of time available for resetting the amplifier between charge measurements.

This problem can be overcome by breaking the reset time into two intervals. In the first time interval, a relatively high bandwidth path is used to reset the voltage at the operational amplifier input to a state that is close to the final state. The input to the operational amplifier is then connected to a low bandwidth path that provides the final adjustment in the input voltage. Since the input to the operational amplifier is close to the final voltage at the end of the first time period, the amount by which the voltage needs to be changed to arrive at the final reset value is small enough that this voltage change can be provided through a low bandwidth path. Hence, the reset noise is substantially reduced while maintaining a short reset time.

One method for altering the impedance of the reset during the reset process is to utilize FET 53 in an analog mode. During the first time period, the reset signal is set to a potential that provides the minimum resistance through FET 53. At the end of the first time period, the reset signal is ramped back to zero continuously over the second time period such that the impedance through FET 53 increases continuously over the second time period in a manner that allows the potential at node 38 to come to equilibrium while continuously decreasing the bandwidth of the reset path. In one embodiment, the reset potential is set such that the impedance through FET 53 increases linearly over the second time period. The second time period is typically of the same length as the first time period.

The reset signal or signals discussed above can be generated on chip 60 and coupled to the CCD chip via pad 56, which is analogous to pads 54 and 55 discussed above. A controller 65 on chip 60 provides the signals needed to control the reset operation as well as other functions such as driving the gates in the CCD array to move the charges onto node 38.

The above embodiments utilize a single feedback capacitance value, either in the form of a single capacitor or a fixed array of capacitors. The feedback capacitor sets the gain of the image sensor chip; hence, to change the gain, a new CCD chip must be fabricated. Since the desired gain depends on the amount of light that is incident on the CCD array, embodiments that allow the gain of the operational amplifier to be changed in response to the light conditions are desirable. In prior art systems, the feedback capacitor is located on the processing chip, and hence, can be easily changed by including an array of capacitors on that chip, with the currently used capacitor being specified by the user or an automated system based on the light levels.

Figure 5:
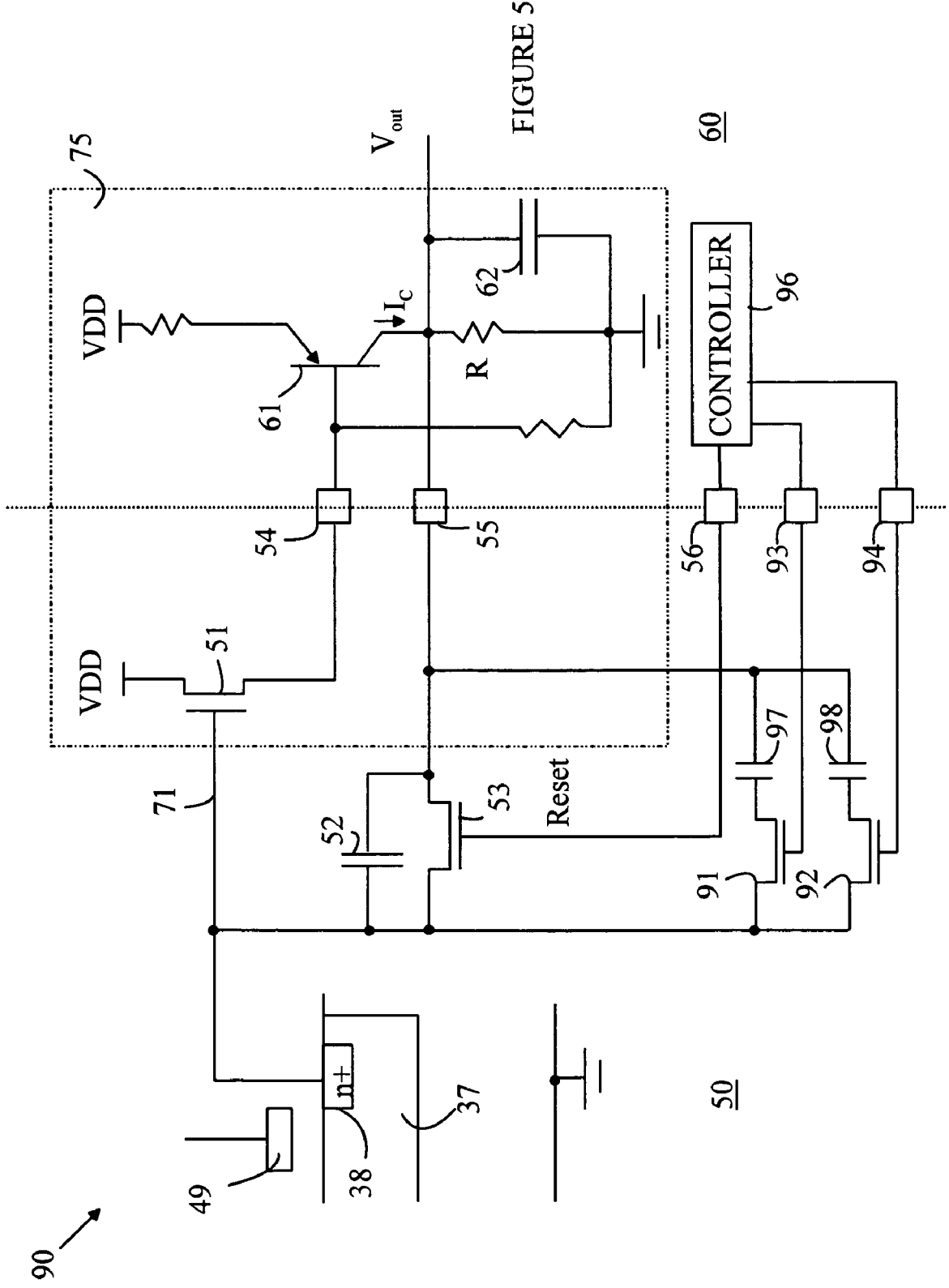
FIG. 5 illustrates an image sensor according to another embodiment of the present invention.

Refer now to FIG. 5, which illustrates an image sensor 90 according to another embodiment of the present invention. Image sensor 90 differs from image sensor 70 shown in FIG. 3 in that an array of feedback capacitors is included on the CCD chip 50. The array is constructed from capacitors 52, 97, and 98. Capacitors 97 and 98 are switched into the array by FETs 91 and 92. FETs 91 and 92 are controlled by a controller 96 on chip 60 via pads 93 and 94. Controller 96 also provides the control functions discussed above with respect to controller 65 discussed above. The minimum feedback capacitance, and hence, the highest gain is obtained when capacitors 97 and 98 are not connected. By switching FETs 97 and/or 98, the gain can be reduced to process pixels that were exposed to high light intensities.

Various modifications to the present invention will become apparent to those skilled in the art from the foregoing description and accompanying drawings. Accordingly, the present invention is to be limited solely by the scope of the following claims.

What is claimed is:

1. An image sensor comprising:
   a first substrate having a CCD array fabricated thereon in a first fabrication system, said CCD array comprising a plurality of pixels that accumulate charge when exposed to light and a node through which charge from each of said pixels passes during a readout operation;

a first FET fabricated on said first substrate in said first fabrication system, said first FET having a gate connected to said node and a source or drain connected to a first conducting pad on said first substrate;

a first capacitor connecting said node to a second conducting pad on said first substrate; and a first switch fabricated on said first substrate in said first fabrication system, said first switch being connected across said first capacitor such that said first capacitor is shorted when said first switch is closed, said first switch being controlled by a reset signal on a third conducting pad on said first substrate.

2. The image sensor of claim 1 wherein said first switch comprises an FET having a gate connected to said third conducting pad.

3. The image sensor of claim 1 wherein said first capacitor is characterized by an effective capacitance between first and second terminals, said switch being connected across said first and second terminals of said first capacitor; and wherein said first capacitor comprises an array of capacitors connected such that the effective capacitance between said first and second terminals is less than the capacitance of any of said capacitors in said array.

4. The image sensor of claim 1 further comprising a second capacitor and a second switch for connecting said second capacitor in parallel with said first capacitor, said second switch being controlled by a signal on a fourth conducting pad on said first substrate.

5. The image sensor of claim 1 further comprising a second substrate having fourth, fifth, and sixth conducting pads connected to said first, second, and third conducting pads, respectively; and an amplifier having an input connected to said third pad and an output connected to said fourth pad.

6. The image sensor of claim 5 wherein said amplifier is fabricated in a second fabrication system that is different from said first fabrication system.

7. The image sensor of claim 5 wherein said amplifier comprises a bipolar transistor located on said second substrate.

8. The image sensor of claim 5 further comprising a controller for operating said first switch, said controller being connected to said fifth pad.

* * * * *